(12) United States Patent
Chen et al.

(10) Patent No.: US 11,824,449 B2
(45) Date of Patent: Nov. 21, 2023

(54) SWITCHED-CAPACITOR POWER STAGE AND SWITCHED-CAPACITOR CONVERTER

(71) Applicant: NOVATEK Microelectronics Corp., Hsinchu (TW)

(72) Inventors: Ke Horng Chen, New Taipei (TW); Kai-Syun Chang, Hsinchu County (TW); Chin Hsiang Liang, Hsinchu County (TW); Shu-Yung Lin, Kaohsiung (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 70 days.

(21) Appl. No.: 17/452,232

(22) Filed: Oct. 25, 2021

(65) Prior Publication Data
US 2023/0128793 A1    Apr. 27, 2023

(51) Int. Cl.
*H02M 3/158*    (2006.01)
*H02M 1/00*    (2006.01)
*H02M 3/07*    (2006.01)

(52) U.S. Cl.
CPC ......... *H02M 3/1584* (2013.01); *H02M 1/007* (2021.05); *H02M 3/07* (2013.01); *H02M 1/0095* (2021.05)

(58) Field of Classification Search
CPC .... H02M 3/1584; H02M 3/07; H02M 1/0095; H02M 1/007
See application file for complete search history.

(56) References Cited

U.S. PATENT DOCUMENTS

| | | | |
|---|---|---|---|
| 2009/0102439 A1* | 4/2009 | Williams | H02M 3/07 323/266 |
| 2018/0130940 A1* | 5/2018 | Chaput | H02M 3/1582 |
| 2019/0379288 A1 | 12/2019 | Chaput et al. | |
| 2020/0028434 A1 | 1/2020 | Ge et al. | |
| 2020/0350821 A1* | 11/2020 | Cannillo | H02M 3/07 |
| 2021/0135577 A1* | 5/2021 | Li | H02M 3/1584 |
| 2022/0376625 A1* | 11/2022 | Liu | H02M 1/0095 |

FOREIGN PATENT DOCUMENTS

| | | |
|---|---|---|
| CN | 103051242 A | 4/2013 |
| CN | 104218832 B | 12/2016 |
| CN | 206962701 U | 2/2018 |
| CN | 107896059 A | 4/2018 |
| CN | 110249516 A | 9/2019 |
| JP | 2017-147858 A | 8/2017 |
| TW | 201234758 A | 8/2012 |

\* cited by examiner

*Primary Examiner* — Alex Torres-Rivera
(74) *Attorney, Agent, or Firm* — CKC & Partners Co., LLC

(57) ABSTRACT

A switched-capacitor power stage includes a first sub-power stage. The first sub-power stage includes a first inductor, a first high switch, a first low switch, and a first set of switched-capacitor networks. The first inductor is coupled to an input terminal. The first high switch is coupled between the first inductor and an output terminal. The first low switch is coupled between the first inductor and a first transition node. The first set of switched-capacitor networks is coupled between the first transition node and the output terminal.

15 Claims, 12 Drawing Sheets

US 11,824,449 B2

1

SWITCHED-CAPACITOR POWER STAGE AND SWITCHED-CAPACITOR CONVERTER

BACKGROUND

Technical Field

The present disclosure relates to converter technology. More particularly, the present disclosure relates to a switched-capacitor power stage and a switched-capacitor converter.

Description of Related Art

With development of technology, switched-capacitor (SC) converters have been applied to various circuits. In some related arts, a voltage conversion ratio (VCR) of a switched-capacitor converter is better but switching loss, ripple, and hard charging loss are larger. In some related arts, switching loss, ripple, and hard charging loss of a switched-capacitor converter are smaller but a voltage conversion ratio of the switched-capacitor converter is limited (e.g., too small).

SUMMARY

Some aspects of the present disclosure are to provide a switched-capacitor power stage. The switched-capacitor power stage includes a first sub-power stage. The first sub-power stage includes a first inductor, a first high switch, a first low switch, and a first set of switched-capacitor networks. The first inductor is coupled to an input terminal. The first high switch is coupled between the first inductor and an output terminal. The first low switch is coupled between the first inductor and a first transition node. The first set of switched-capacitor networks is coupled between the first transition node and the output terminal.

Some aspects of the present disclosure are to provide a switched-capacitor converter. The switched-capacitor converter includes a plurality of sub-power stages and a controller. Each of the sub-power stages includes an inductor, a high switch, a low switch, a set of switched-capacitor networks, and a driver. The inductor is coupled to an input terminal. The high switch is coupled between the inductor and an output terminal. The low switch is coupled between the inductor and a transition node. The set of switched-capacitor networks are coupled between the transition node and the output terminal. The driver is configured to control the set of switched-capacitor networks. The controller is configured to generate a plurality of control signals and a plurality of enable signals according to an output voltage at the output terminal, a first reference voltage, and a second reference voltage. The driver is further configured to generate a plurality of gate signals according to the control signals and the enable signals to control a plurality of switches in the set of switched-capacitor networks.

BRIEF DESCRIPTION OF THE DRAWINGS

The disclosure can be more fully understood by reading the following detailed description of the embodiment, with reference made to the accompanying drawings as follows.

2

Figure 1:
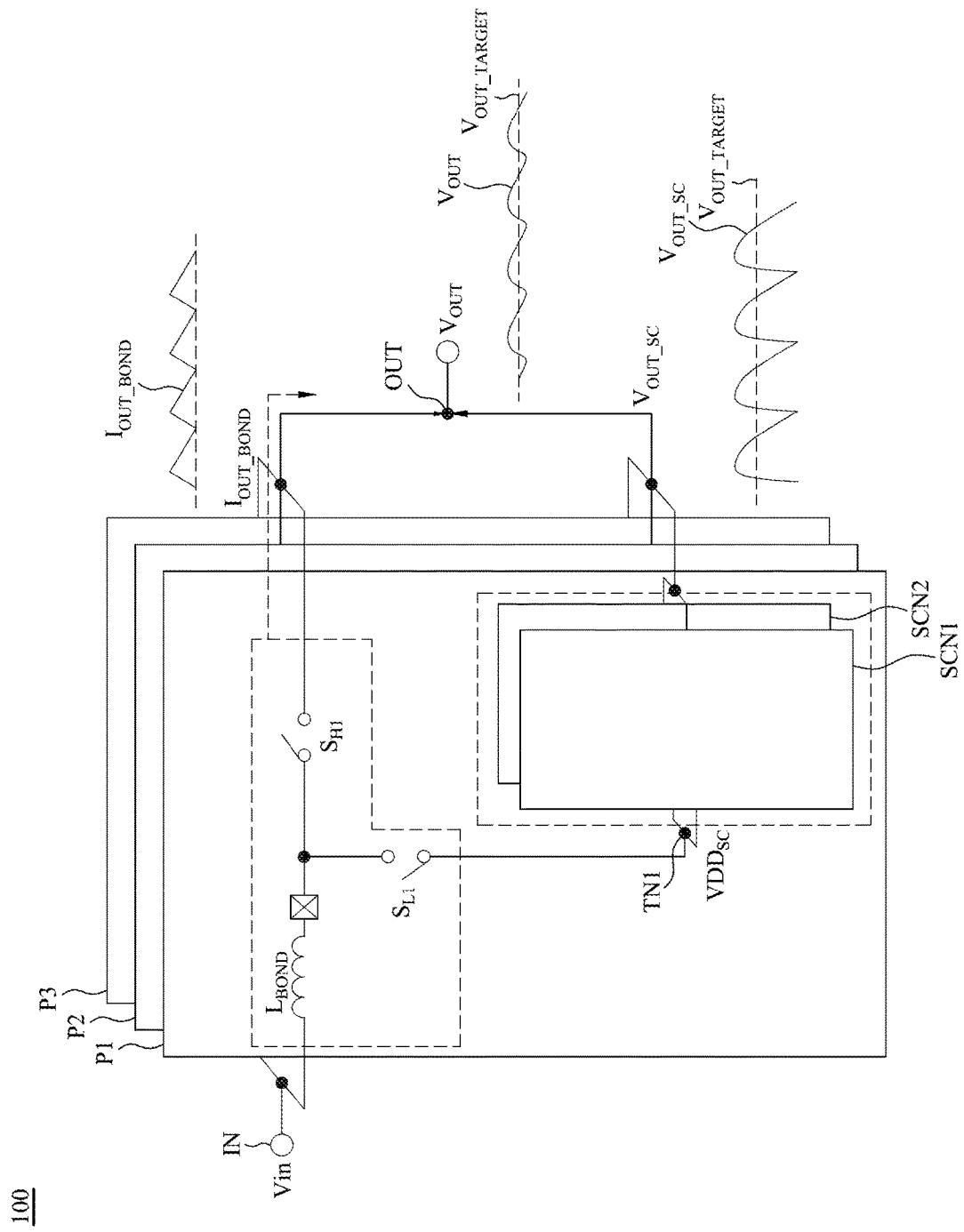
FIG. 1 is a schematic diagram illustrating a switched-capacitor power stage according to some embodiments of the present disclosure.
Figure 2A:
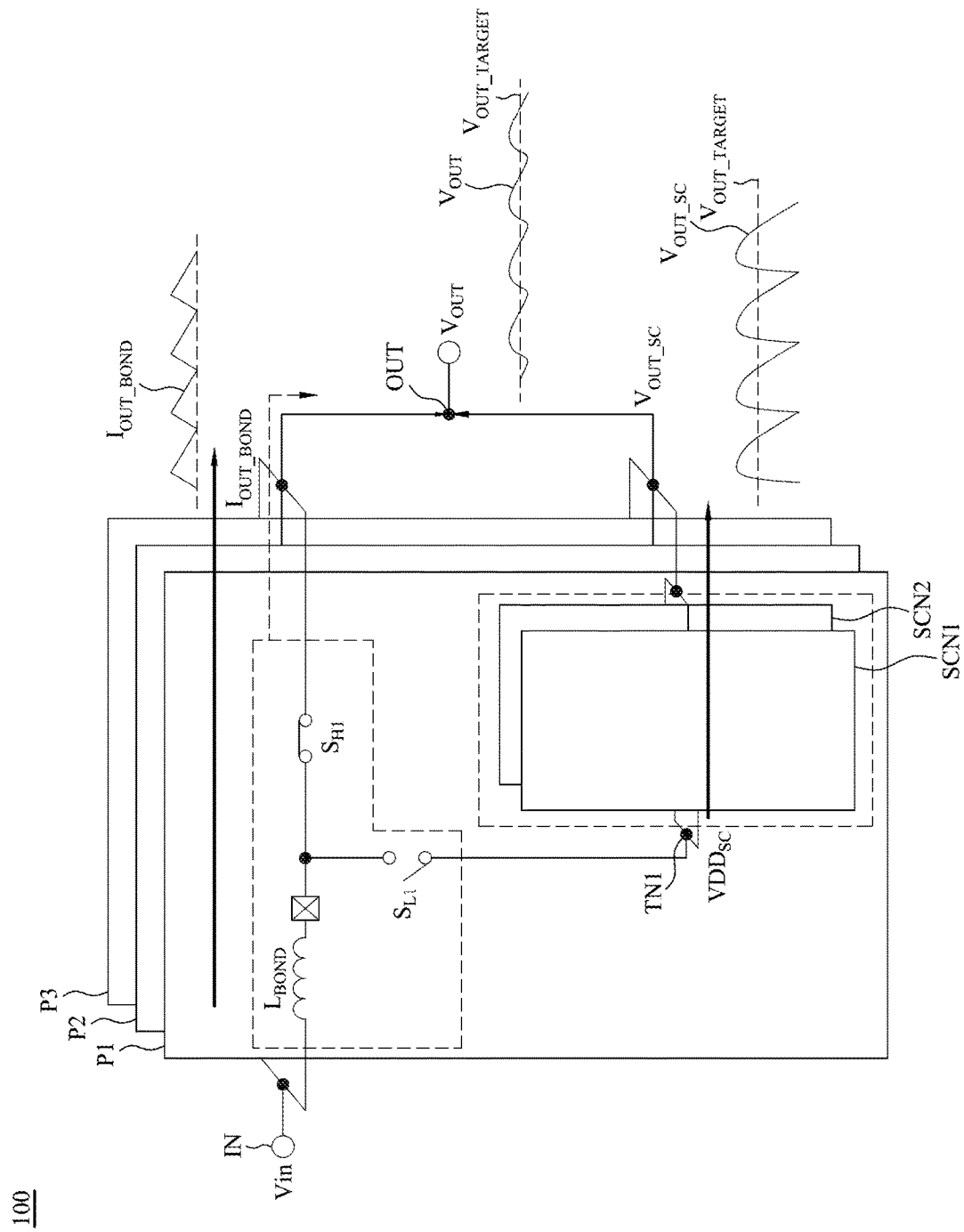

FIG. 2A is a schematic diagram illustrating the switched-capacitor power stage in FIG. 1 operating in a first phase according to some embodiments of the present disclosure.

Figure 2B:
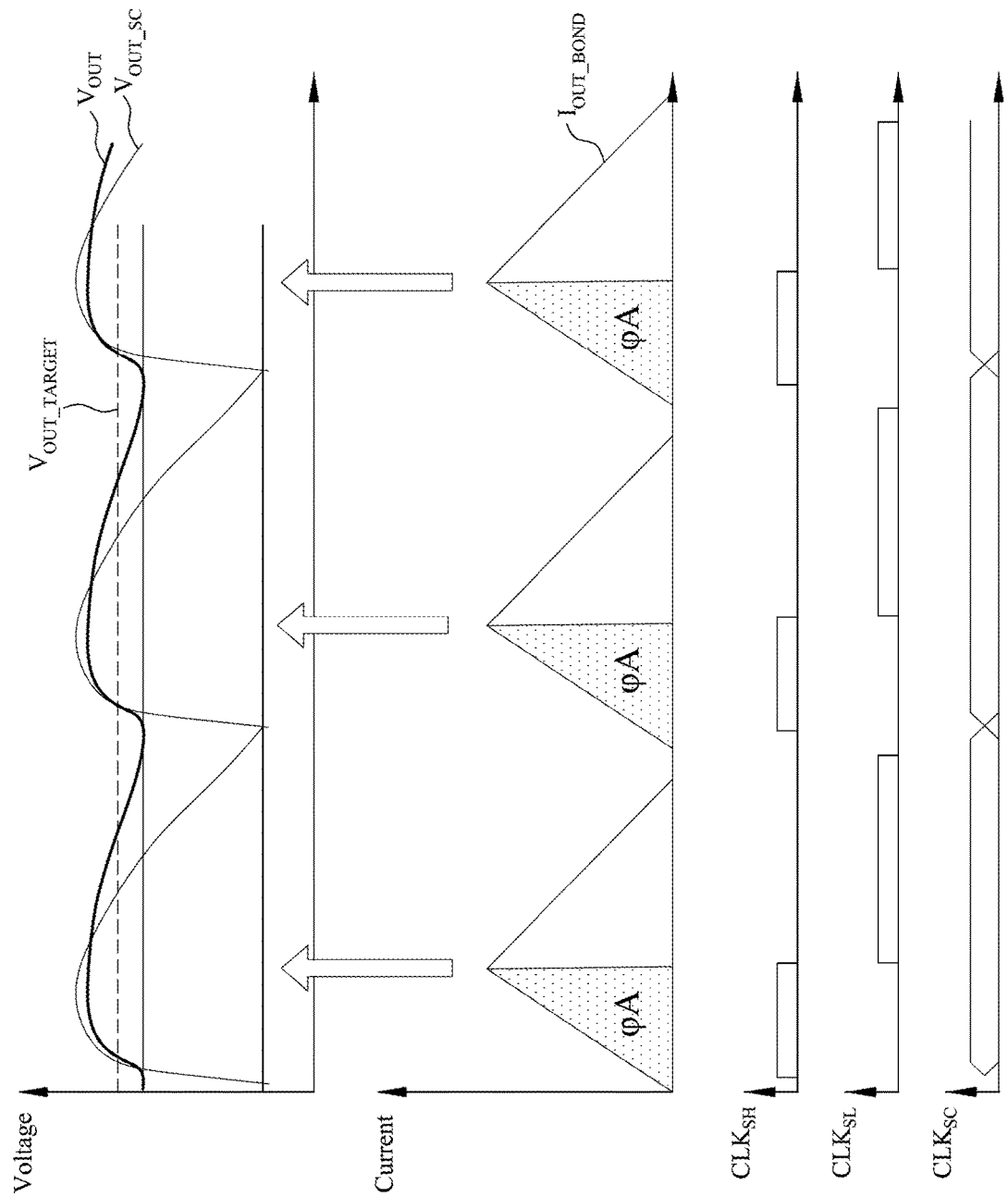

FIG. 2B is a schematic diagram illustrating waveforms of signals associated with FIG. 2A according to some embodiments of the present disclosure.

Figure 3A:
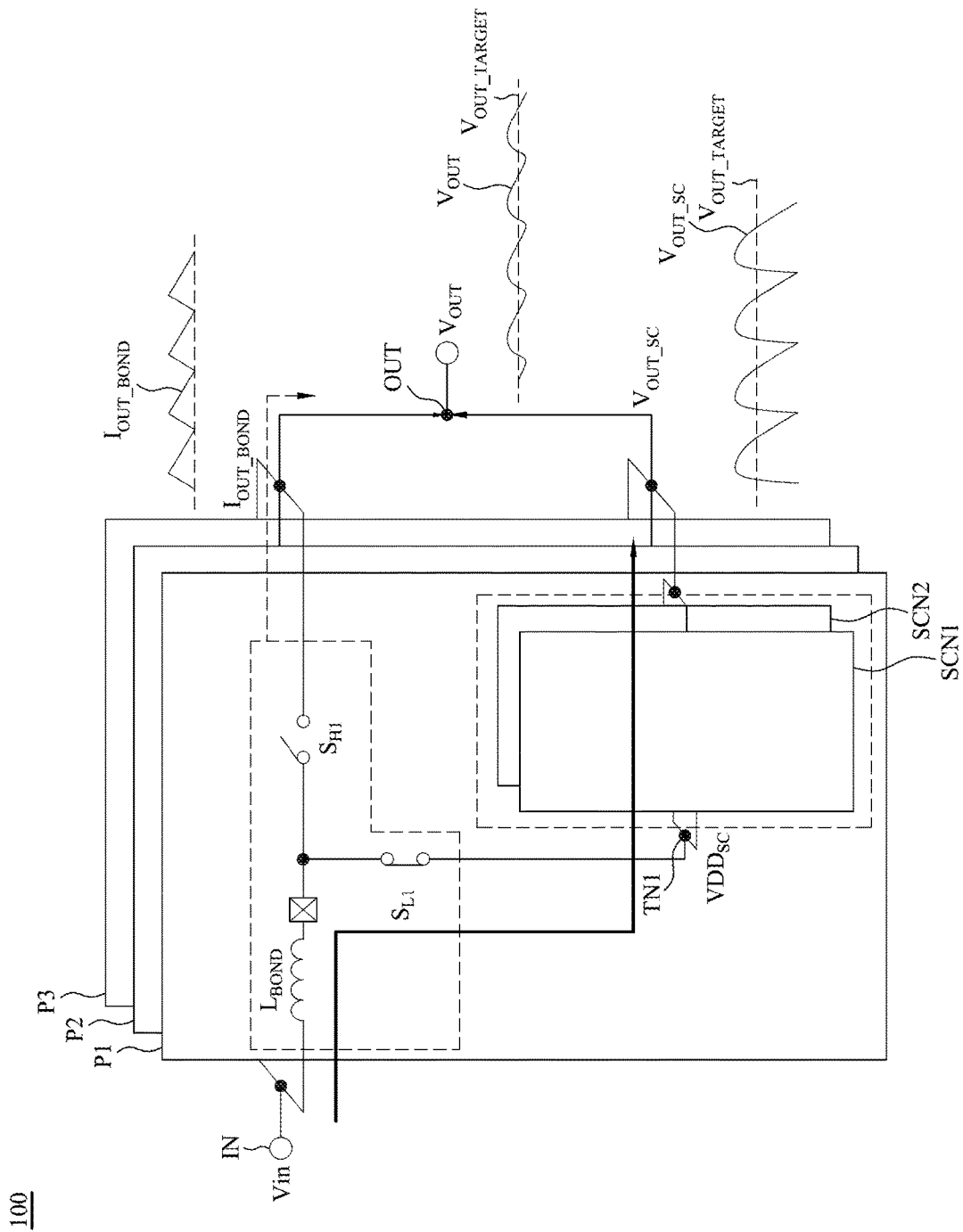

FIG. 3A is a schematic diagram illustrating the switched-capacitor power stage in FIG. 1 operating in a second phase according to some embodiments of the present disclosure.

Figure 3B:
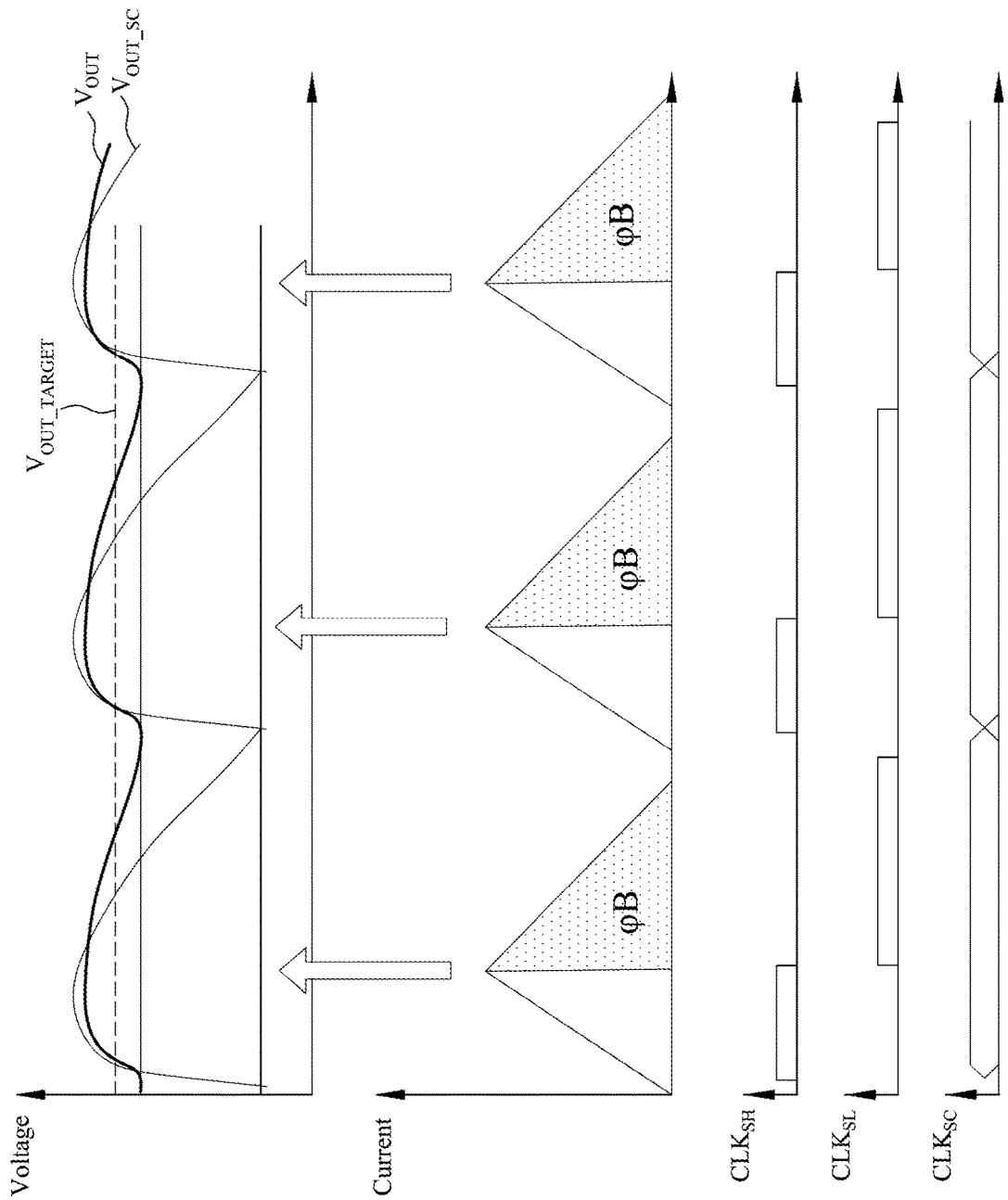

FIG. 3B is a schematic diagram illustrating waveforms of signals associated with FIG. 3A according to some embodiments of the present disclosure.

Figure 4:
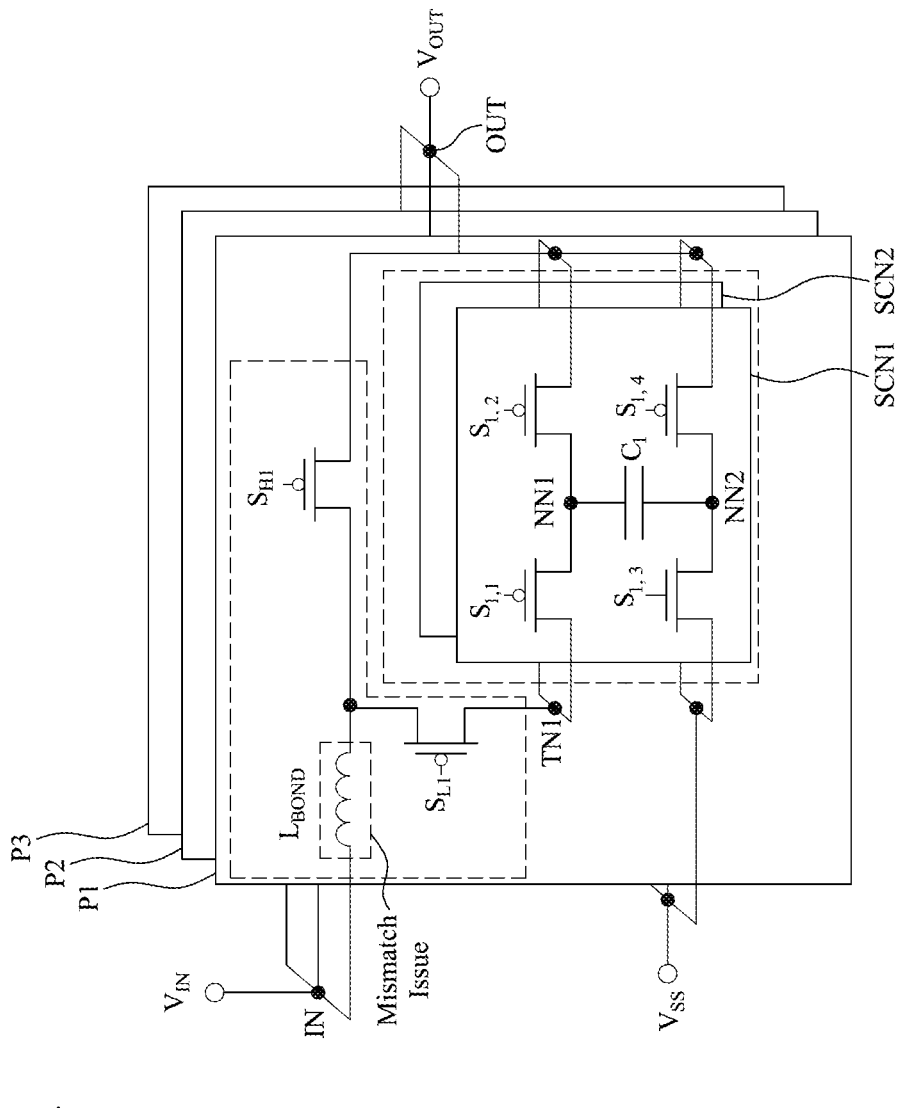

FIG. 4 is a schematic diagram illustrating a switched-capacitor power stage according to some embodiments of the present disclosure.

Figure 5:
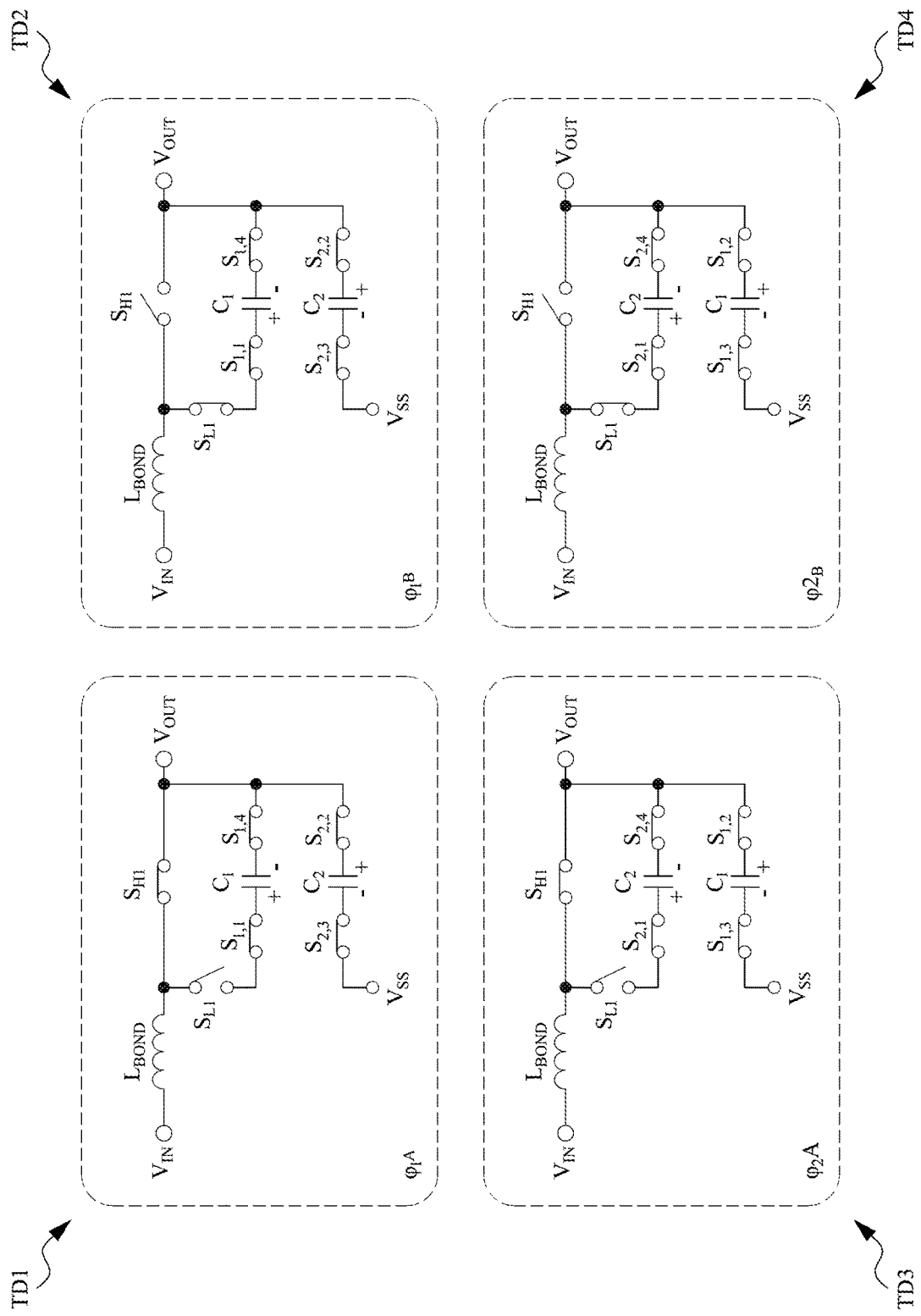

FIG. 5 is a schematic diagram illustrating operations of the switched-capacitor networks in FIG. 4 in four time intervals according to some embodiments of the present disclosure.

Figure 6:
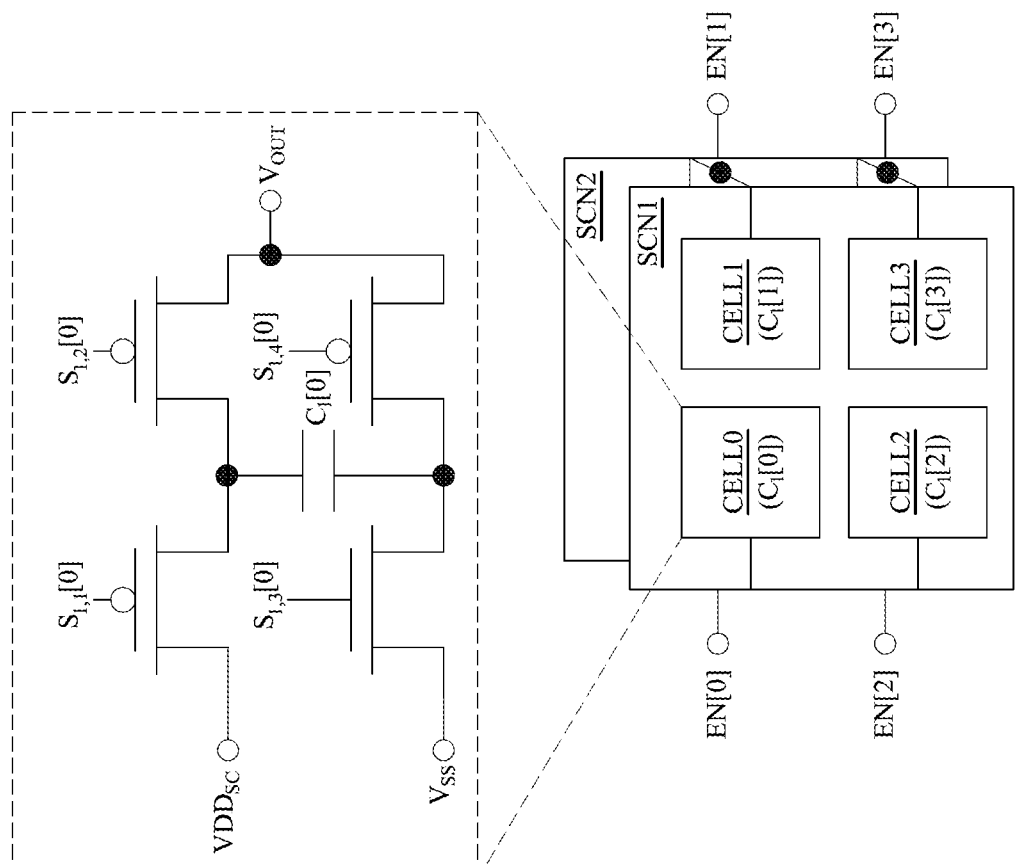

FIG. 6 is a schematic diagram illustrating a split structure of the switched-capacitor networks in FIG. 4 according to some embodiments of the present disclosure.

Figure 7:
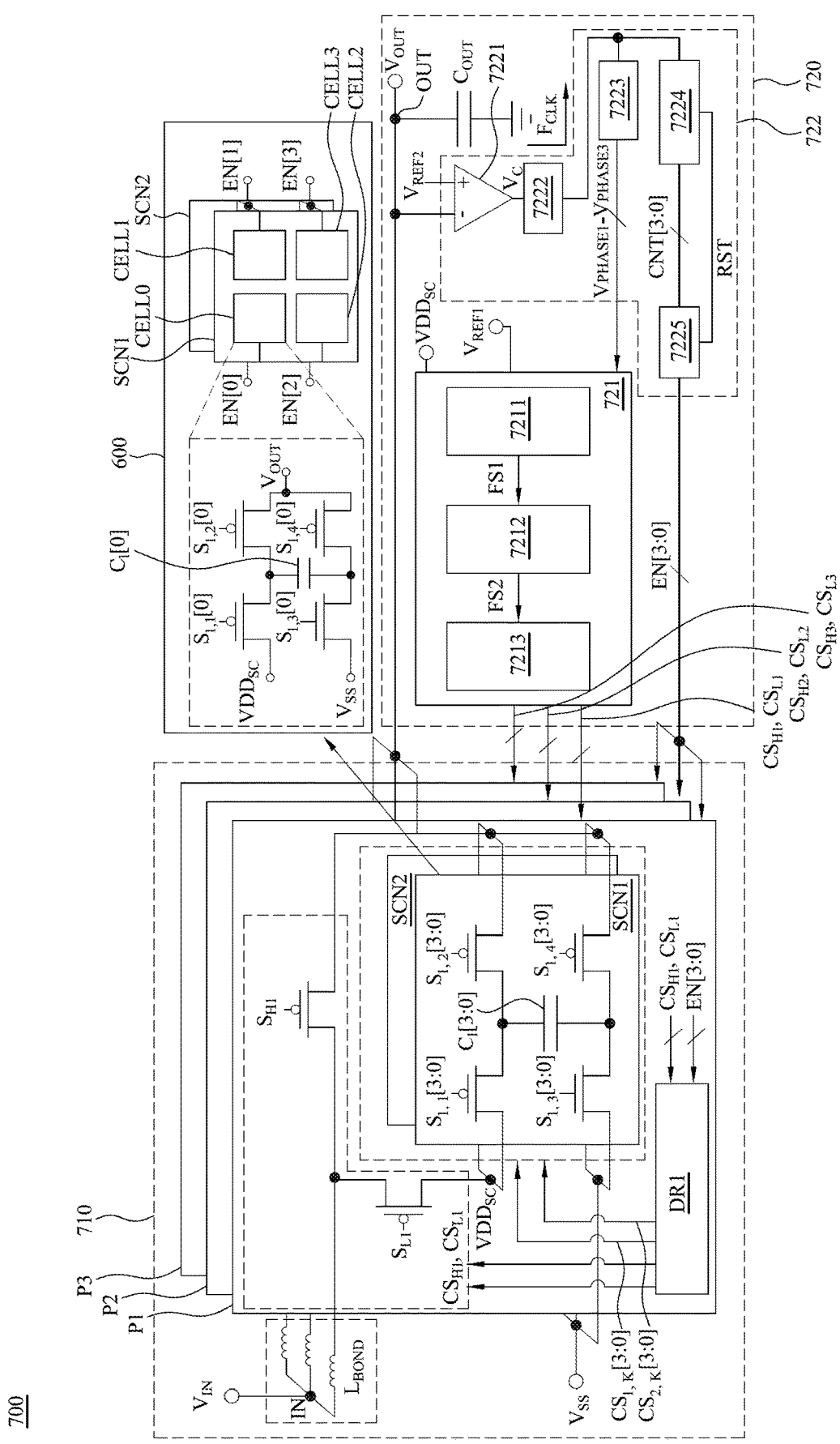

FIG. 7 is a schematic diagram illustrating a switched-capacitor converter according to some embodiments of the present disclosure.

Figure 8:
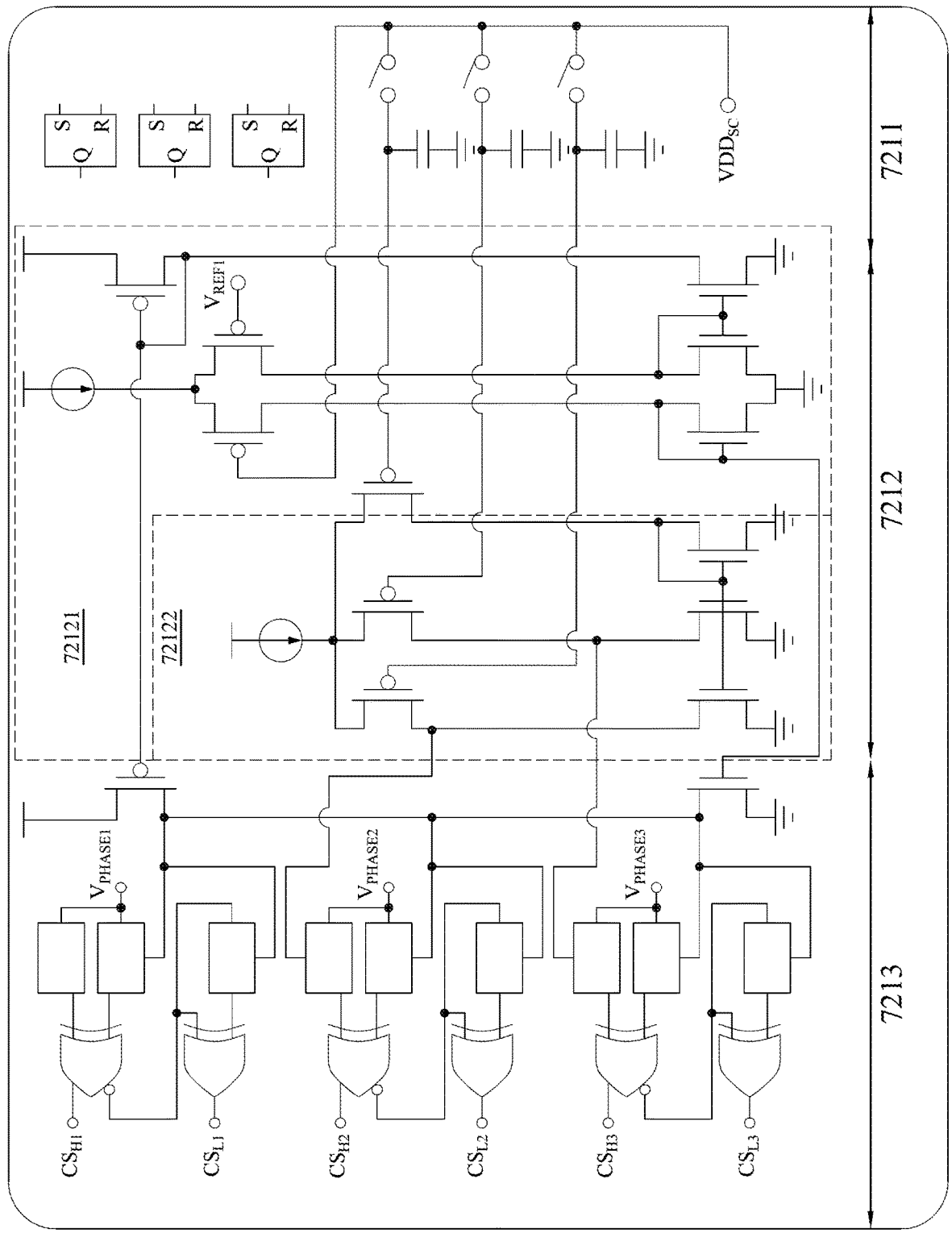

FIG. 8 is a schematic diagram illustrating a pulse control loop circuit in FIG. 7 according to some embodiments of the present disclosure.

Figure 9:
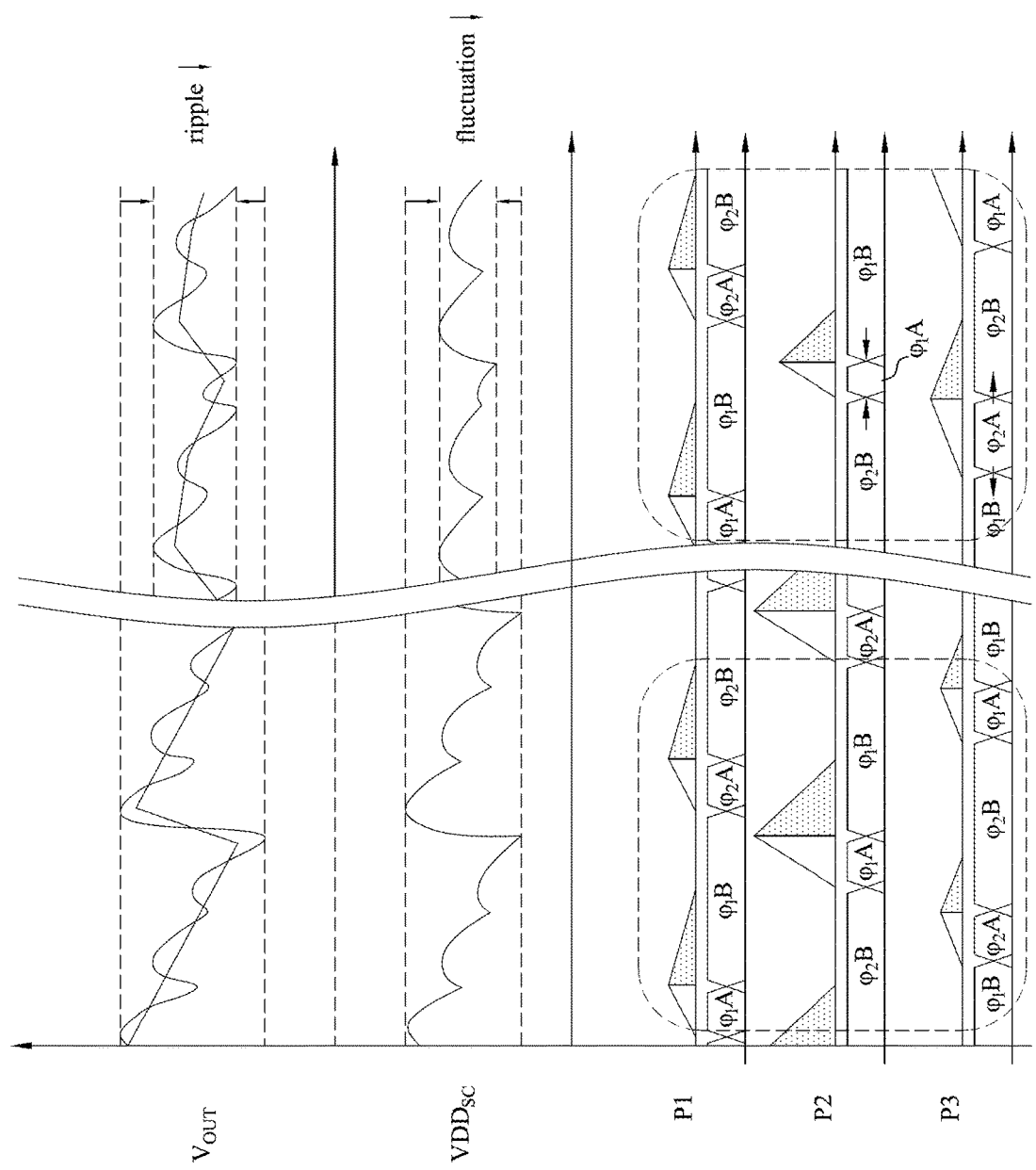

FIG. 9 is a schematic diagram illustrating waveforms of signals in sub-power stages according to some embodiments of the present disclosure.

Figure 10:
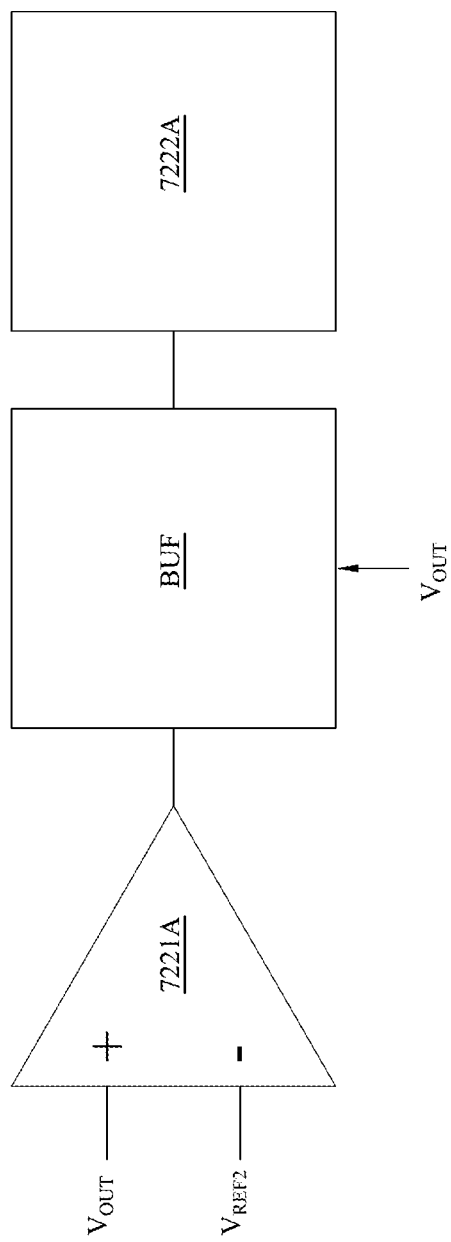

FIG. 10 is a schematic diagram illustrating a buffer coupled between an operation amplifier and a voltage-controlled oscillator according to some embodiments of the present disclosure.

DETAILED DESCRIPTION

In the present disclosure, "connected" or "coupled" may refer to "electrically connected" or "electrically coupled." "Connected" or "coupled" may also refer to operations or actions between two or more elements.

Reference is made to FIG. 1. FIG. 1 is a schematic diagram illustrating a switched-capacitor power stage 100 according to some embodiments of the present disclosure.

As illustrated in FIG. 1, the switched-capacitor power stage 100 includes a plurality of sub-power stages P1-P3. These sub-power stages P1-P3 have similar structures. For the purpose of simplicity and ease of understanding, following paragraphs takes the sub-power stage P1 as an example.

The sub-power stage P1 includes an inductor $L_{BOND}$, a high switch $S_{H1}$, a low switch $S_{L1}$, and a set of switched-capacitor networks SCN1-SCN2. The inductor $L_{BOND}$ is coupled to an input terminal IN. An input voltage $V_{IN}$ is received at the input terminal IN. The high switch $S_{H1}$ is coupled between the inductor $L_{BOND}$ and an output terminal OUT. The low switch $S_{L1}$ is coupled between the inductor $L_{BOND}$ and a transition node TN1. The set of switched-capacitor networks SCN1-SCN2 is coupled between the transition node TN1 and the output terminal OUT. The inductor $L_{BOND}$ can be implemented by a bonding wire.

By controlling the high switch $S_{H1}$ and the low switch $S_{L1}$, a current $I_{OUT\_BOND}$ is generated and flows through the inductor $L_{BOND}$ and a transition voltage $VDD_{SC}$ is generated at the transition node TN1. The set of switched-capacitor networks SCN1-SCN2 generates a voltage $V_{OUT\_SC}$ according to the transition voltage $VDD_{SC}$. Then, an output voltage $V_{OUT}$ is generated at the output terminal OUT according to the voltage $V_{OUT\_SC}$ and a voltage corresponding to the current $I_{OUT\_BOND}$. As waveforms illustrated in FIG. 1, compared to the voltage $V_{OUT\_SC}$, the output voltage $V_{OUT}$ is closer to a target voltage $V_{OUT\_TARGET}$.

The quantity of the sub-power stages of the switched-capacitor power stage 100 is merely illustration, and the present disclosure is not limited thereto.

The switched-capacitor power stage 100 can operate in two phases.

FIG. 2A is a schematic diagram illustrating the switched-capacitor power stage 100 in FIG. 1 operating in a first phase according to some embodiments of the present disclosure. FIG. 2B is a schematic diagram illustrating waveforms of signals associated with FIG. 2A according to some embodiments of the present disclosure. FIG. 3A is a schematic diagram illustrating the switched-capacitor power stage 100 in FIG. 1 operating in a second phase according to some embodiments of the present disclosure. FIG. 3B is a schematic diagram illustrating waveforms of signals associated with FIG. 3A according to some embodiments of the present disclosure.

As illustrated in FIG. 2A and FIG. 2B, in the first phase (e.g., ØA), the high switch $S_{H1}$ is turned on by a switching signal $CLK_{SH}$ and the low switch $S_{L1}$ is turned off by a switching signal $CLK_{SL}$. In other words, the switching signal $CLK_{SH}$ has an enable level in the first phase, and the switching signal $CLK_{SL}$ has a disable level in the first phase. Under this condition, the input voltage $V_{IN}$ can charge (e.g., the current $I_{OUT\_BOND}$) the output terminal OUT through the inductor $L_{BOND}$ and the high switch $S_{H1}$ to increase the output voltage VOUT. The inductor $L_{BOND}$ can also store power from the input voltage $V_{IN}$. In addition, switches in the set of switched-capacitor networks SCN1-SCN2 can be controlled such that a fly capacitor in the set of switched-capacitor networks SCN1-SCN2 can charge the output terminal OUT to increase the output voltage VOUT. This fly capacitor is controlled by a switching signal $CLK_{SC}$.

As illustrated in FIG. 2A and FIG. 2B, since the inductor $L_{BOND}$ can provide an additional current to the output terminal OUT in the first phase, the output voltage $V_{OUT}$ can drop smoothly. Hence, the ripple can be reduced.

As illustrated in FIG. 3A and FIG. 3B, in the second phase (e.g., ØB), the high switch $S_{H1}$ is turned off by the switching signal $CLK_{SH}$ and the low switch $S_{L1}$ is turned on by a switching signal $CLK_{SL}$. In other words, the switching signal $CLK_{SH}$ has a disable level in the second phase, and the switching signal $CLK_{SL}$ has an enable level in the second phase. Under this condition, power stored in the inductor $L_{BOND}$ can be used to charge the transition node TN1 to increase the transition voltage $VDD_{SC}$, and the transition voltage $VDD_{SC}$ can charge the output terminal OUT to support the output voltage $V_{OUT}$. By controlling duties of the switching signal $CLK_{SH}$ and the switching signal $CLK_{SL}$, an appropriate transition voltage $VDD_{SC}$ can be generated.

As illustrated in FIG. 3A and FIG. 3B, since the inductor $L_{BOND}$ can act as a voltage source to make the transition voltage $VDD_{SC}$ at the transition node TN1 be greater than the input voltage $V_{IN}$ at the input terminal IN, a voltage conversion ratio (VCR) of one converter cell in the switched-capacitor power stage 100 can be larger.

References is made to FIG. 4. FIG. 4 is a schematic diagram illustrating a switched-capacitor power stage 400 according to some embodiments of the present disclosure. The switched-capacitor power stage 400 is similar to the switched-capacitor power stage 100 in FIG. 1. As illustrated in FIG. 4 and taking the switched-capacitor network SCN1 as an example, the switched-capacitor network SCN1 includes a switch $S_{1,1}$, a switch $S_{1,2}$, a switch $S_{1,3}$, a switch $S_{1,4}$, and a fly capacitor $C_1$. The switch $S_{1,1}$ is coupled between the transition node TN1 and an inner node NN1. The switch $S_{1,2}$ is coupled between the inner node NN1 and the output terminal OUT. The switch $S_{1,3}$ is configured to receive a voltage $V_{SS}$ and coupled to an inner node NN2. The switch $S_{1,4}$ is coupled between the inner node NN2 and the output terminal OUT. The fly capacitor $C_1$ is coupled between the inner node NN1 and the inner node NN2. In the embodiment of FIG. 4, the switch $S_{1,1}$, the switch $S_{1,2}$, and the switch $S_{1,4}$ are implemented by P-type transistors, and the switch $S_{1,3}$ is implemented by a N-type transistor, but the present disclosure is not limited thereto.

The switched-capacitor network SCN2 has a similar structure, so it is not described herein again. References is made to FIG. 5. FIG. 5 is a schematic diagram illustrating operations of the switched-capacitor networks SCN1-SCN2 in FIG. 4 in four time intervals according to some embodiments of the present disclosure. Similar to the switched-capacitor network SCN1 in FIG. 4, the switched-capacitor network SCN2 includes a switch $S_{2,1}$, a switch $S_{2,2}$, a switch $S_{2,3}$, a switch $S_{2,4}$, and a fly capacitor $C_2$.

Taking the sub-power stage P1 as an example, a working period includes a time interval TD1, a time interval TD2, a time interval TD3, and a time interval TD4 sequentially. The time interval TD1 and the time interval TD3 correspond to the aforementioned first phase (e.g., ØA), and the time interval TD2 and the time interval TD4 correspond to the aforementioned second phase (e.g., ØB). In other words, in the time interval TD1 (e.g., $Ø_1A$) and the time interval TD3 (e.g., $Ø_2A$), the high switch $S_{H1}$ of the sub-power stage P1 is turned on and the low switch $S_{L1}$ of the sub-power stage P1 is turned off. In the time interval TD2 (e.g., $Ø_1B$) and the time interval TD4 (e.g., $Ø_2B$), the high switch $S_{H1}$ of the sub-power stage P1 is turned off and the low switch $S_{L1}$ of the sub-power stage P1 is turned on.

As illustrated in FIG. 5, in the time interval TD1 (e.g., $Ø_1A$) and the time interval TD2 (e.g., $Ø_1B$), the switch $S_{1,1}$ and the switch $S_{1,4}$ of the switched-capacitor networks SCN1 and the switch $S_{2,3}$ and the switch $S_{2,2}$ of the switched-capacitor networks SCN2 are turned on. In addition, the switch $S_{1,2}$ and the switch $S_{1,3}$ of the switched-capacitor networks SCN1 and the switch $S_{2,1}$ and the switch $S_{2,4}$ of the switched-capacitor networks SCN2 are turned off.

On the contrary, in the time interval TD3 (e.g., $Ø_2A$) and the time interval TD4 (e.g., $Ø_2B$), the switch $S_{1,2}$ and the switch $S_{1,3}$ of the switched-capacitor networks SCN1 and the switch $S_{2,1}$ and the switch $S_{2,4}$ of the switched-capacitor networks SCN2 are turned on. In addition, the switch $S_{1,1}$ and the switch $S_{1,4}$ of the switched-capacitor networks SCN1 and the switch $S_{2,3}$ and the switch $S_{2,2}$ of the switched-capacitor networks SCN2 are turned off.

As illustrated in FIG. 5 and FIG. 2B, in the time interval TD1 (e.g., $Ø_1A$) and the time interval TD3 (e.g., $Ø_2A$), the inductor $L_{BOND}$ is coupled with the switched-capacitor networks SCN1-SCN2 in a parallel form when the output voltage OUT decreases. The inductor $L_{BOND}$ can act as a current source to provide an additional current $I_{OUT\_BOND}$ to support the output voltage $V_{OUT}$. Hence, the output voltage $V_{OUT}$ drops smoothly and the ripple can be reduced.

As illustrated in FIG. 5 and FIG. 3B, in the time interval TD2 (e.g., $Ø_1B$) and the time interval TD4 (e.g., $Ø_2B$), the inductor $L_{BOND}$ is coupled with the switched-capacitor networks SCN1-SCN2 in a series form. The inductor $L_{BOND}$ can act as a voltage source to make the transition voltage $VDD_{SC}$ higher than the input voltage $V_{IN}$. Hence, the output voltage $V_{OUT}$ can be higher than $V_{IN}/2$. In other words, the voltage conversion ration can be greater than ½.

The aforementioned operations in the time intervals TD1-TD4 can reduce the ripple. The sub-power stages P2-P3 have similar structures and operations, so they are not described herein again.

Compared to some related arts with more switches, the present disclosure has fewer switches, so the switching loss and the conduction loss in the present disclosure are smaller.

Compared to some related arts with the same number switches, in the present disclosure, more power is provide to the output voltage $V_{OUT}$ during each working period (e.g., the fly caps in the switched-capacitor networks SCN1-SCN2 provide power in the first phase ØA and the inductor $L_{BOND}$ provides power in the second phase ØB), so the ripple and the hard charging loss in the present disclosure are smaller, and the switching frequency (switching loss) in the present disclosure can be smaller.

In addition, the present disclosure is suitable for applications with small capacitor sizes. Small capacitors are easily fully charged and the peak of the inductor current is low, so the conduction loss in the present disclosure is not increased too much. Further, the inductor $L_{BOND}$ acts as a current source to make the output voltage $V_{OUT}$ drop smoothly when the inductor $L_{BOND}$ is coupled with the switched-capacitor networks SCN1-SCN2 in the parallel form (e.g., $Ø_1A$ and $Ø_2A$), and the inductor $L_{BOND}$ acts as a voltage source to make the transition voltage $VDD_{SC}$ be greater than the input voltage $V_{IN}$ when the inductor $L_{BOND}$ is coupled with the switched-capacitor networks SCN1-SCN2 (e.g., $Ø_1B$ and $Ø_2B$) in the series form. Thus, the ripple can be smaller and the voltage conversion ration can be greater than ½ such that the efficiency is better.

References is made to FIG. 6. FIG. 6 is a schematic diagram illustrating a split structure 600 according to some embodiments of the present disclosure. The split structure 600 illustrates that the switched-capacitor networks SCN1-SCN2 in FIG. 4 is split into converter cells. In some embodiments, each of the switched-capacitor networks SCN1 and SCN2 in FIG. 4 can be split into a plurality of converter cells.

FIG. 6 takes the switched-capacitor networks SCN1 as an example. As illustrated in FIG. 6, the switched-capacitor network SCN1 is split into multiple converter cells CELL0, CELL1, CELL2, and CELL3. Each of the converter cells CELL0, CELL1, CELL2, and CELL3 has a structure similar to the switched-capacitor network SCN1 in FIG. 4. Taking the converter cell CELL0 as an example, the converter cell CELL0 includes a switch $S_{1,1}[0]$, a switch $S_{1,2}[0]$, a switch $S_{1,3}[0]$, a switch $S_{1,4}[0]$, and a fly capacitor $C_1[0]$.

It is assumed that a capacitance value of the fly capacitor C1 in FIG. 4 is $C_{FLY}$. Then, a capacitance value of the fly capacitor $C_1[0]$ in the converter cell CELL0 can be $C_{FLY}/15$, a capacitance value of the fly capacitor $C_1[1]$ in the converter cell CELL1 can be $2C_{FLY}/15$, a capacitance value of the fly capacitor $C_1[2]$ in the converter cell CELL2 can be $4C_{FLY}/15$, and a capacitance value of the fly capacitor $C_1[3]$ in the converter cell CELL3 can be $8C_{FLY}/15$. In other words, the capacitance value of the fly capacitor $C_1[1]$ is twice the capacitance value of the fly capacitor $C_1[0]$, the capacitance value of the fly capacitor $C_1[2]$ is twice the capacitance value of the fly capacitor $C_1[1]$, and the capacitance value of the fly capacitor $C_1[3]$ is twice the capacitance value of the fly capacitor $C_1[2]$.

By splitting each of the switched-capacitor networks SCN1 and SCN2 in FIG. 4 into FIG. 6, the switch $S_{1,1}$, the switch $S_{1,2}$, the switch $S_{1,3}$, the switch $S_{1,4}$, and the capacitor $C_1$ in FIG. 4 are split. Enable signals EN[0]-EN[3] (associated with operating frequency) are used to generate gate signals which are configured to control these switches so as to control the usage of these split capacitors. Hence, in a light load mode, power provide to the output terminal OUT is less by controlling the usage of the split capacitors. Since power provide to the output terminal OUT is less, less extra charges are accumulated on an output capacitor (e.g., an output capacitor $C_{OUT}$ in FIG. 7). Thus, the ripple can be reduced and this can prevent the switching loss from increasing. The details about the enable signals EN[0]-EN[3] (the enable signals EN[0:3]) are described in following paragraphs.

The switched-capacitor network SCN2 has a similar structure, so it is not described herein again.

Reference is made to FIG. 7. FIG. 7 is a schematic diagram illustrating a switched-capacitor converter 700 according to some embodiments of the present disclosure. The switched-capacitor converter 700 includes a switched-capacitor power stage 710 and a controller 720. The controller 720 is coupled to the switched-capacitor power stage 710.

The switched-capacitor power stage 710 is similar to the switched-capacitor power stage 400 in FIG. 4 with the split structure 600 in FIG. 6. Taking the sub-power stage P1 as an example, the sub-power stage P1 further includes a driver DR1, and the driver DR1 is configured to control the high switches $S_{H1}$, the low switch $S_{L1}$, and the switches in the switched-capacitor networks SCN1-SCN2 to be turned on or turned off.

The controller 720 is configured to generate control signals $CS_{H1}$, $CS_{L1}$, $CS_{H2}$, $CS_{L2}$, $CS_{H3}$, $CS_{L3}$ and the enable signals EN[3:0] according to the output voltage VOUT at the output terminal OUT, a reference voltage $V_{REF1}$, and a reference voltage $V_{REF2}$.

As illustrated in FIG. 7, the controller 720 includes a pulse control loop circuit 721, a frequency control loop circuit 722, and the output capacitor $C_{OUT}$.

The pulse control loop circuit 721 receives the transition voltage $VDD_{SC}$ from the switched-capacitor power stage 710. The pulse control loop circuit 721 can generate the control signals control signals $CS_{H1}$, $CS_{L1}$, $CS_{H2}$, $CS_{L2}$, $CS_{H3}$, $CS_{L3}$ according to the transition voltage $VDD_{SC}$ and the reference voltage $V_{REF1}$. FIG. 8 is a schematic diagram illustrating the pulse control loop circuit 721 in FIG. 7 according to some embodiments of the present disclosure. As illustrated in FIG. 7 and FIG. 8, the pulse control loop circuit 721 includes a sample and hold circuit 7211, a mismatch calibration circuit 7212, and a timing logic circuit 7213. The sample and hold circuit 7211 generates first signals FS1 according to the transition voltage $VDD_{SC}$. The mismatch calibration circuit 7212 generates second signals FS2 according to the first signals FS1 and the reference voltage $V_{REF1}$. The timing logic circuit 7213 generates the control signals $CS_{H1}$, $CS_{L1}$, $CS_{H2}$, $CS_{L2}$, $CS_{H3}$, $CS_{L3}$ according to the second signals FS2 and phase Signals $V_{PHASE1}$-$V_{PHASE3}$.

The driver DR1 in the sub-power stage P1 can receive the control signals $CS_{H1}$, $CS_{L1}$, and output the control signals $CS_{H1}$, $CS_{L1}$ to control the high switches $S_{H1}$ and the low switch $S_{L1}$ in the sub-power stage P1 respectively. By adjusting duties of the control signals $CS_{H1}$, $CS_{L1}$ to turn on or turn off the high switches $S_{H1}$ and the low switch $S_{L1}$, the transition voltage $VDD_{SC}$ can have an appropriate value with respective to the output voltage $V_{OUT}$.

The frequency control loop circuit 722 and the output capacitor $C_{OUT}$ are coupled to the output terminal OUT. The frequency control loop circuit 722 can generate the enable signals EN[3:0] according to the output voltage $V_{OUT}$ and the reference voltage $V_{REF2}$.

As illustrated in FIG. 7, the frequency control loop circuit 722 includes an operation amplifier 7221, a voltage-controlled oscillator 7222, a phase divider 7223, a counter 7224, and a finite state machine circuit 7225.

The operation amplifier 7221 generates a comparison signal $V_C$ according to the output voltage $V_{OUT}$ and the reference voltage $V_{REF2}$. The voltage-controlled oscillator 7222 generates a frequency clock signal $F_{CLK}$ according to the comparison signal $V_C$. The comparison signal $V_C$ is associated with the output voltage $V_{OUT}$. When the output voltage $V_{OUT}$ is too low, the frequency (e.g., the frequency clock signal $F_{CLK}$) generated by the voltage-controlled oscillator 7222 is higher to prevent the circuit with smaller capacitors from breakdown. Explained in another way, the frequency clock signal $F_{CLK}$ can vary according to the load of the circuit to increase the efficiency (e.g., switching frequency of the switches can be controlled to be lower in the light load mode). The phase divider 7223 generates the phase signals $V_{PHASE1}$-$V_{PHASE3}$ according to the frequency clock signal $F_{CLK}$ and outputs the phase signals $V_{PHASE1}$-$V_{PHASE3}$ to the pulse control loop circuit 721. The counter 7224 generates counting signals CNT[3:0] according to the frequency clock signal $F_{CLK}$. The finite state machine circuit 7225 generates the enable signals EN[3:0] according to the counting signals CNT[3:0] and a reset signal RST.

Based on descriptions above, the driver DR1 receives the control signals $CS_{H1}$, $CS_{L1}$ from the pulse control loop circuit 721 and receives the enable signals EN[3:0] from the frequency control loop circuit 722. The driver DR1 generates gate signals $CS_{1,K}[3:0]$ and $CS_{2,K}[3:0]$ according to the control signals $CS_{H1}$, $CS_{L1}$ and the enable signals EN[3:0]. The gate signals $CS_{1,K}[3:0]$ is configured to control the switches $S_{1,1}[3:0]$, $S_{1,2}[3:0]$, $S_{1,3}[3:0]$, $S_{1,4}[3:0]$ in the switched-capacitor network SCN1 (e.g., the gate signals $CS_{1,1}[3:0]$ controls the switches $S_{1,1}[3:0]$ respectively), and the gate signals $CS_{2,K}[3:0]$ is configured to control the switches in the switched-capacitor network SCN2.

Operations of the drivers in the sub-power stages P2-P3 are similar to the driver DR1 in the sub-power stage P1, so they are not described herein again.

As described above, the switched-capacitor power stage 710 is designed with multiple sub-power stages P1-P3 for reducing ripple and frequency. However, there is a mismatch issue among the three inductors $L_{BOND}$ in the sub-power stages P1-P3. For example, under a condition that the high switches and the low switches in the sub-power stages P1-P3 are tuned on for the same time, the sub-power stage with a smaller inductance would acquire more power and the ripple at the output terminal OUT would increase. On the contrary, the sub-power stage with a larger inductance would acquire less power. The mismatch calibration circuit 7212 can be used to prevent the mismatch issue.

Reference is made to FIG. 9. FIG. 9 is a schematic diagram illustrating waveforms of signals in the sub-power stages P1-P3 according to some embodiments of the present disclosure.

The mismatch calibration circuit 7212 can extend the turned-on time of the switches in the sub-power stage with a larger inductance (e.g., the sub-power stage P3), and shorten the turned-on time of the switches in the sub-power stage with a smaller inductance (e.g., the sub-power stage P2) to prevent the aforementioned mismatch issue.

As illustrated in FIG. 8, the mismatch calibration circuit 7212 includes a coarse tune circuit 72121 and a fine tune circuit 72122. The coarse tune circuit 72121 trims switching time of a master stage, and the fine tune circuit 72122 trims switching time of other slave stages relative to the master stage.

Reference is made to FIG. 10. FIG. 10 is a schematic diagram illustrating a buffer BUF coupled between an operation amplifier 7221A and a voltage-controlled oscillator 7222A according to some embodiments of the present disclosure.

The operation amplifier 7221A is similar to the operation amplifier 7221 in FIG. 7. The voltage-controlled oscillator 7222A is similar to the voltage-controlled oscillator 7222 in FIG. 7. The buffer BUF is coupled between the operation amplifier 7221A and the voltage-controlled oscillator 7222A. The quiescent current of the buffer BUF is small and the buffer BUF can greatly improve the transient response.

Based on the descriptions above, in the present disclosure, the switching loss, the conduction loss, and the ripple are smaller, and the voltage conversion ratio is larger. Hence, the efficiency of the present disclosure is better.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A switched-capacitor power stage, comprising:
    a first sub-power stage comprising:
        a first inductor coupled to an input terminal;
        a first high switch coupled between the first inductor and an output terminal;
        a first low switch coupled between the first inductor and a first transition node; and
        a first set of switched-capacitor networks coupled between the first transition node and the output terminal,
        wherein when the first high switch is turned off and the first low switch is turned on, the first inductor and the first set of switched-capacitor networks are coupled in series; and
    a second sub-power stage comprising:
        a second inductor coupled to the input terminal;
        a second high switch coupled between the second inductor and the output terminal;
        a second low switch coupled between the second inductor and a second transition node; and
        a second set of switched-capacitor networks coupled between the second transition node and the output terminal.

2. The switched-capacitor power stage of claim 1, wherein a transition voltage at the first transition node is greater than an input voltage at the input terminal.

3. The switched-capacitor power stage of claim 1, further comprising:
    a third sub-power stage comprising:
        a third inductor coupled to the input terminal;

a third high switch coupled between the third inductor and the output terminal;
a third low switch coupled between the third inductor and a third transition node; and
a third set of switched-capacitor networks coupled between the third transition node and the output terminal.

4. The switched-capacitor power stage of claim 1, wherein the first set of switched-capacitor networks comprises a first switched-capacitor network and a second switched-capacitor network,
wherein each of the first switched-capacitor network and the second switched-capacitor network comprises:
a first switch coupled between the first transition node and a first inner node;
a second switch coupled between the first inner node and the output terminal;
a third switch configured to receive a voltage and coupled to a second inner node;
a fourth switch coupled between the second inner node and the output terminal; and
a capacitor coupled between the first inner node and the second inner node.

5. The switched-capacitor power stage of claim 4, wherein a working period comprises a first time interval, a second time interval, a third time interval, and a fourth time interval sequentially,
wherein in the first time interval and in the third time interval, the first high switch is turned on and the first low switch is turned off,
wherein in the second time interval and in the fourth time interval, the first high switch is turned off and the first low switch is turned on.

6. The switched-capacitor power stage of claim 5,
wherein in the first time interval and in the second time interval, the first switch of the first switched-capacitor network, the fourth switch of the first switched-capacitor network, the second switch of the second switched-capacitor network, and the third switch of the second switched-capacitor network are turned on, and the second switch of the first switched-capacitor network, the third switch of the first switched-capacitor network, the first switch of the second switched-capacitor network, and the fourth switch of the second switched-capacitor network are turned off,
wherein in the third time interval and in the fourth time interval, the first switch of the first switched-capacitor network, the fourth switch of the first switched-capacitor network, the second switch of the second switched-capacitor network, and the third switch of the second switched-capacitor network are turned off, and the second switch of the first switched-capacitor network, the third switch of the first switched-capacitor network, the first switch of the second switched-capacitor network, and the fourth switch of the second switched-capacitor network are turned on.

7. A switched-capacitor converter, comprising:
a plurality of sub-power stages, wherein each of the sub-power stages comprises:
an inductor coupled to an input terminal;
a high switch coupled between the inductor and an output terminal;
a low switch coupled between the inductor and a transition node;
a set of switched-capacitor networks coupled between the transition node and the output terminal; and
a driver configured to control the set of switched-capacitor networks; and
a controller configured to generate a plurality of control signals and a plurality of enable signals according to an output voltage at the output terminal, a first reference voltage, and a second reference voltage,
wherein the driver is further configured to generate a plurality of gate signals according to the control signals and the enable signals to control a plurality of switches in the set of switched-capacitor networks.

8. The switched-capacitor converter of claim 7, wherein the driver is further configured to output the control signals to control the high switches and the low switches in the sub-power stages.

9. The switched-capacitor converter of claim 7, wherein the controller comprises:
a pulse control loop circuit configured to generate the control signals according to a transition voltage at the transition node and the first reference voltage; and
a frequency control loop circuit configured to generate the enable signals according to the output voltage and the second reference voltage.

10. The switched-capacitor converter of claim 9, wherein the pulse control loop circuit comprises:
a sample and hold circuit configured to generate first signals according to the transition voltage;
a mismatch calibration circuit configured to generate second signals according to the first signals and the first reference voltage; and
a timing logic circuit configured to generate the control signals according to the second signals.

11. The switched-capacitor converter of claim 9, wherein the frequency control loop circuit comprises:
an operation amplifier configured to generate a comparison signal according to the output voltage and the second reference voltage;
a voltage-controlled oscillator configured to generate a frequency clock signal according to the comparison signal;
a counter configured to generate a plurality of counting signals according to the frequency clock signal; and
a finite state machine circuit configured to generate the enable signals according to the counting signals.

12. The switched-capacitor converter of claim 11, wherein the frequency control loop circuit further comprises:
a phase divider configured to generate phase signals according to the frequency clock signal and output the phase signals to the pulse control loop circuit.

13. The switched-capacitor converter of claim 11, wherein the frequency control loop circuit further comprises:
a buffer coupled between the operation amplifier and the voltage-controlled oscillator.

14. The switched-capacitor converter of claim 7, wherein each of the set of switched-capacitor networks comprises a first converter cell, a second converter cell, a third converter cell, and a fourth converter cell,
wherein each of the first converter cell, the second converter cell, the third converter cell, and the fourth converter cell comprises:
a first switch coupled between the transition node and a first inner node;
a second switch coupled between the first inner node and the output terminal;
a third switch coupled to a second inner node;
a fourth switch coupled between the second inner node and the output terminal; and a capacitor coupled between the first inner node and the second inner node.

15. The switched-capacitor converter of claim 14, wherein a capacitance value of the capacitor in the second converter cell is twice a capacitance value of the capacitor in the first converter cell, a capacitance value of the capacitor in the third converter cell is twice the capacitance value of the capacitor in the second converter cell, and a capacitance value of the capacitor in the fourth converter cell is twice the capacitance value of the capacitor in the third converter cell.

* * * * *